US008499470B1

(12) United States Patent
Hilton

(10) Patent No.: US 8,499,470 B1
(45) Date of Patent: Aug. 6, 2013

(54) TEMPLATE FOR CUTTING QUILTING FABRICS

(76) Inventor: Richard William Hilton, Gainesville, FL (US)

( * ) Notice: Subject to any disclaimer, the term of this patent is extended or adjusted under 35 U.S.C. 154(b) by 276 days.

(21) Appl. No.: 13/104,405

(22) Filed: May 10, 2011

Related U.S. Application Data

(60) Provisional application No. 61/332,865, filed on May 10, 2010.

(51) Int. Cl.
*G01B 3/14* (2006.01)
*B43L 7/027* (2006.01)
*B43L 7/033* (2006.01)

(52) U.S. Cl.
USPC .................................. 33/562; 33/474; 33/482

(58) Field of Classification Search
USPC .................. 33/1 B, 452, 465, 474, 482, 672, 33/563, 566
See application file for complete search history.

(56) References Cited

U.S. PATENT DOCUMENTS

| | | | | |
|---|---|---|---|---|
| 2,653,387 | A * | 9/1953 | Cameron | 33/562 |
| 6,467,179 | B1 * | 10/2002 | Wolf | 33/465 |
| 8,397,396 | B2 * | 3/2013 | Nethery | 33/566 |
| 2007/0193049 | A1 * | 8/2007 | Vetromila | 33/436 |
| 2012/0204437 | A1 * | 8/2012 | Nethery | 33/566 |
| 2012/0227275 | A1 * | 9/2012 | Goldrick et al. | 33/562 |

* cited by examiner

*Primary Examiner* — G. Bradley Bennett
(74) *Attorney, Agent, or Firm* — James J. Claus

(57) ABSTRACT

The invention relates in part to templates used to aid in cutting, marking, or otherwise guiding a tool along two edges that intersect in an inside corner. The edges are extended past the point of intersection with channels so that the cutting, marking, or other operation may proceed fully up to the point of intersection or past the point of intersection if desired.

11 Claims, 12 Drawing Sheets

TEMPLATE FOR CUTTING QUILTING FABRICS

CROSS REFERENCE TO RELATED APPLICATIONS

The present application claims priority to U.S. provisional application 61/332,865, filed on May 10, 2010, which is incorporated herein by reference in its entirety.

BACKGROUND OF THE INVENTION

Rotary cutters are useful in cutting a variety of materials, including quilting fabrics, and precise cuts may be aided by templates to guide the rotary cutter along an edge. However, rotary cutters have long had a disadvantage in that they are poorly suited to cutting inside corners when using previously known templates. The curvature of the cutting blade has previously prevented rotary cutters from finishing cuts made to inside corners of standard templates. Cuts have often been finished by hand without the benefit of a template, resulting in wasted time and reduced precision of cut.

BRIEF SUMMARY OF THE INVENTION

The invention relates in part to templates used to aid in cutting, marking, or otherwise guiding a tool along two edges that intersect in an inside corner. The edges are extended past the point of intersection with channels so that the cutting, marking, or other operation may proceed fully up to the point of intersection or past the point of intersection if desired.

DESCRIPTION OF THE DRAWINGS

In FIG. 3A only the interior of the template is adapted with channels to allow easy cuts at inside corners.

In FIG. 10A, the channel is a void channel that ends in a vertical wall of template material. In FIG. 10B, the channel is initially a void channel, but terminates in a region of reduced thickness with a “ramp” or “inclined plane” profile that the rotary cutter will ride up as the cut is terminated. In FIG. 10C, the channel is initially a void channel, but terminates in a region of reduced thickness via an initial vertical step and then an "arc" profile that matches the curvature of the rotary cutter.

DETAILED DESCRIPTION OF THE INVENTION

The invention relates in part to templates used to aid in cutting, marking, or otherwise guiding a tool along two edges that intersect at an inside corner. The edges are extended past the point of intersection with channels so that the cutting, marking, or other operation may proceed fully up to the point of intersection or past the point of intersection if desired.

As used herein, "inside corner" refers to an intersection of template edges that meet at an angle of less than 180 degrees.

As used herein, "outside corner" refers to an intersection of template edges that meet at an angle of greater than 180 degrees.

Figure 1:
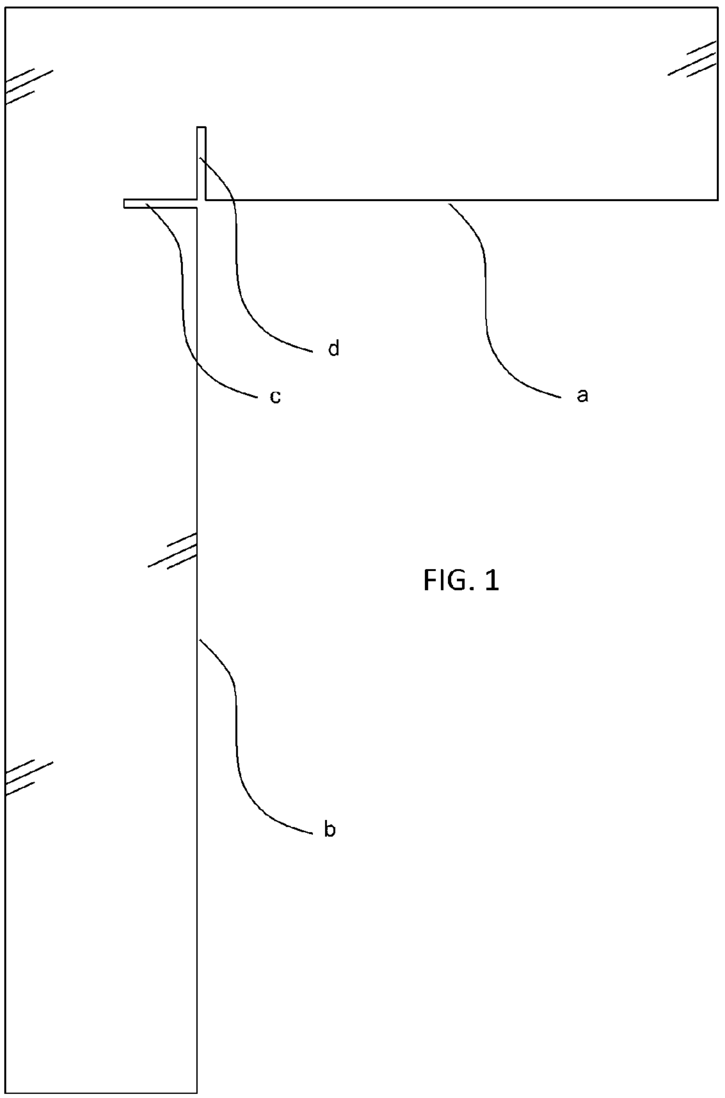
FIG. 1 shows a right angle template. Two edges a and b are indicated. These edges intersect at an inside corner. Two channels c and d extend the edges a and b past the point of their intersection to allow guided cutting of the inside corner with a rotary cutter. Sets of three hash marks merely indicate shading.
Figure 2:
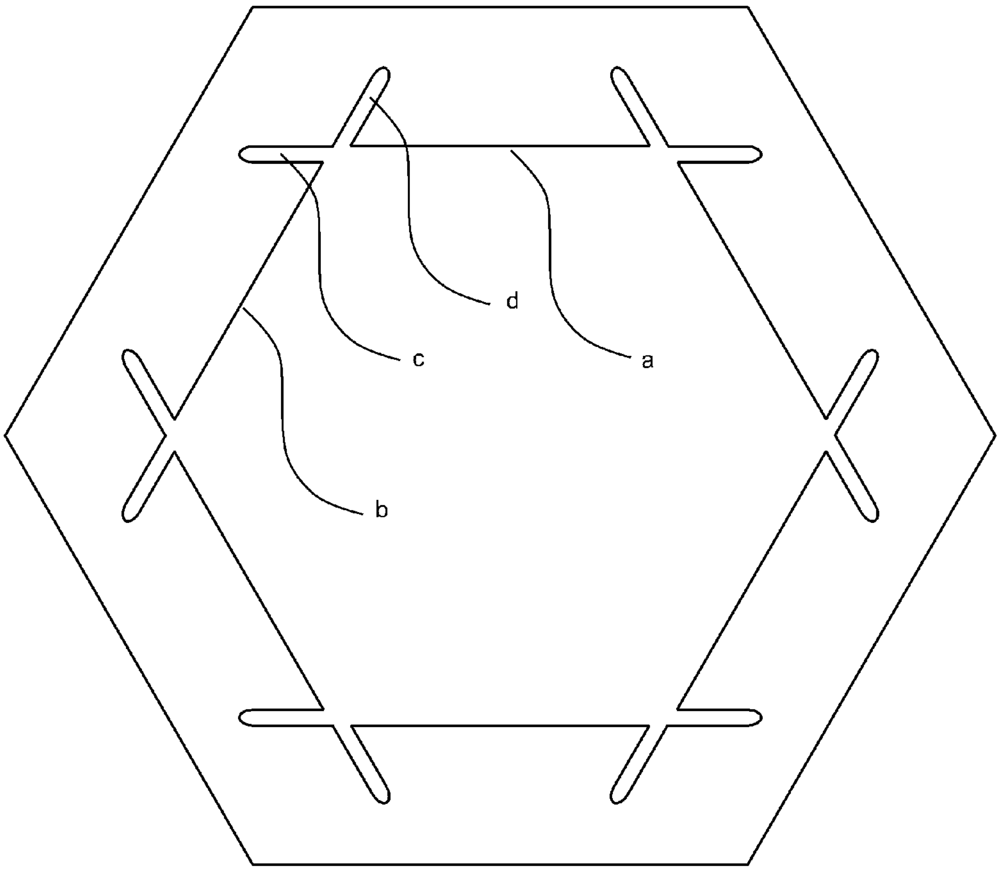
FIG. 2 illustrates a hexagon template. Two edges a and b are indicated. These edges intersect at an inside corner. Two channels c and d extend the edges a and b past the point of their intersection to allow guided cutting of the inside corner with a rotary cutter. Additional edges and channels are apparent but are not labeled.
Figure 3A:
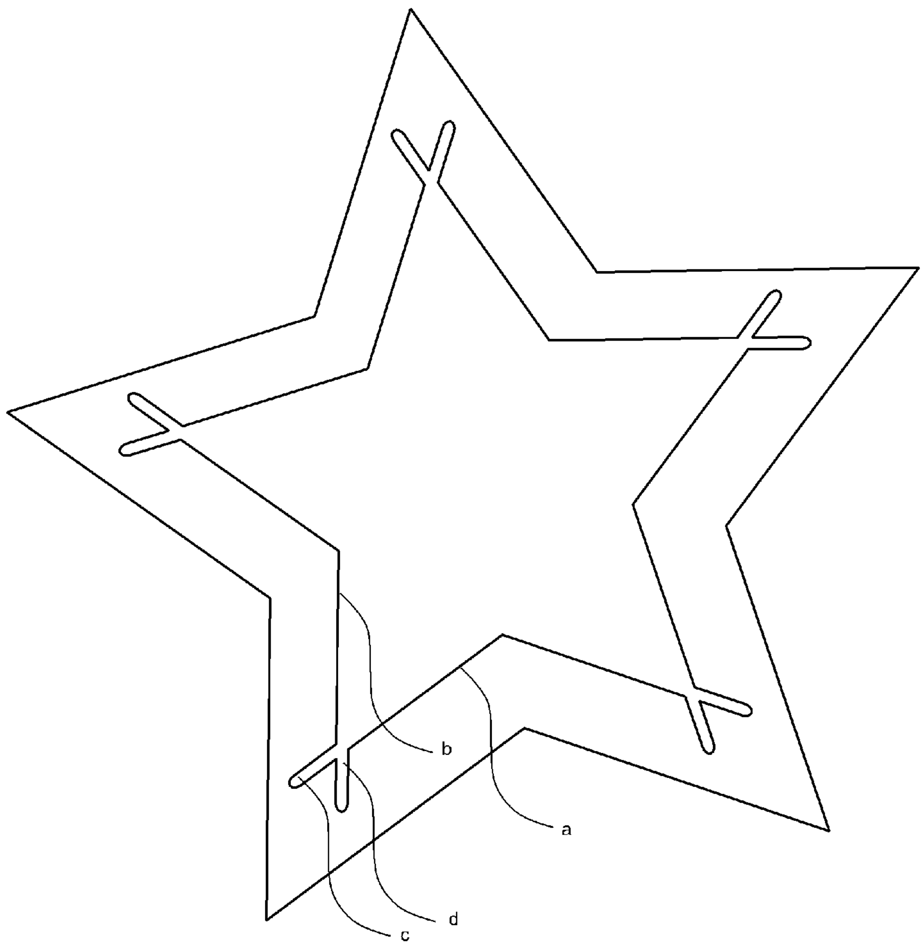
FIG. 3A presents a five-pointed star template. Two edges a and b are indicated. These edges intersect at an inside corner. Two channels c and d extend the edges a and b past the point of their intersection to allow guided cutting of the inside corner with a rotary cutter. Additional edges and channels are apparent but are not labeled.
Figure 3B:
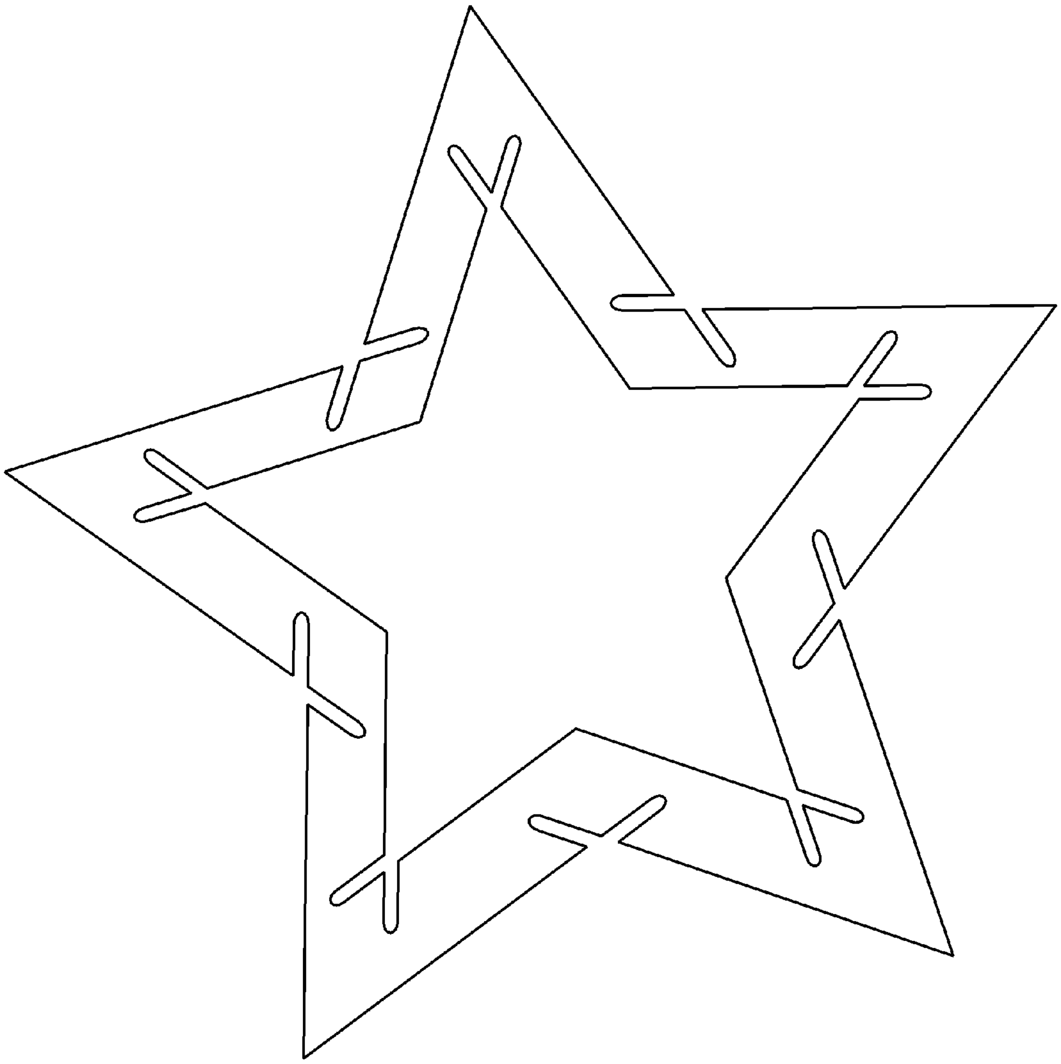
FIG. 3B shows the five-pointed star template of FIG. 3A further modified so that inside corners on the both the exterior and the interior of the template are provided with channels. This allows a user to easily cut a small star using the interior of the template or a large star using the exterior of the template.
Figure 4:
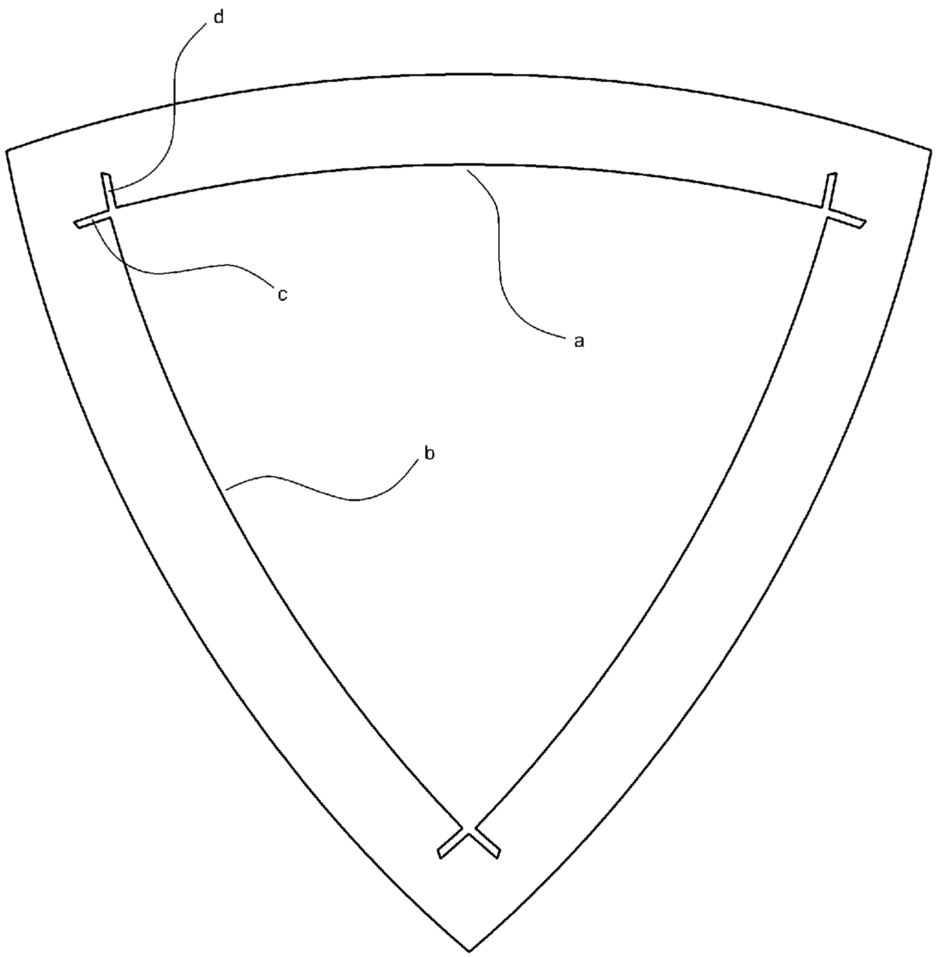
FIG. 4 illustrates a curved triangular template in which the inner edges are concave. Two edges a and b are indicated. These edges intersect at an inside corner. Two channels c and d extend the edges a and b past the point of their intersection to allow guided cutting of the inside corner with a rotary cutter. Additional edges and channels are apparent but are not labeled. It is noted that when guiding a rotary cutter against a concave edge, it may be necessary to tilt the cutter away from the edge while cutting. A channel extending a concave edge may require additional width to accommodate this cutter tilt.
Figure 5:
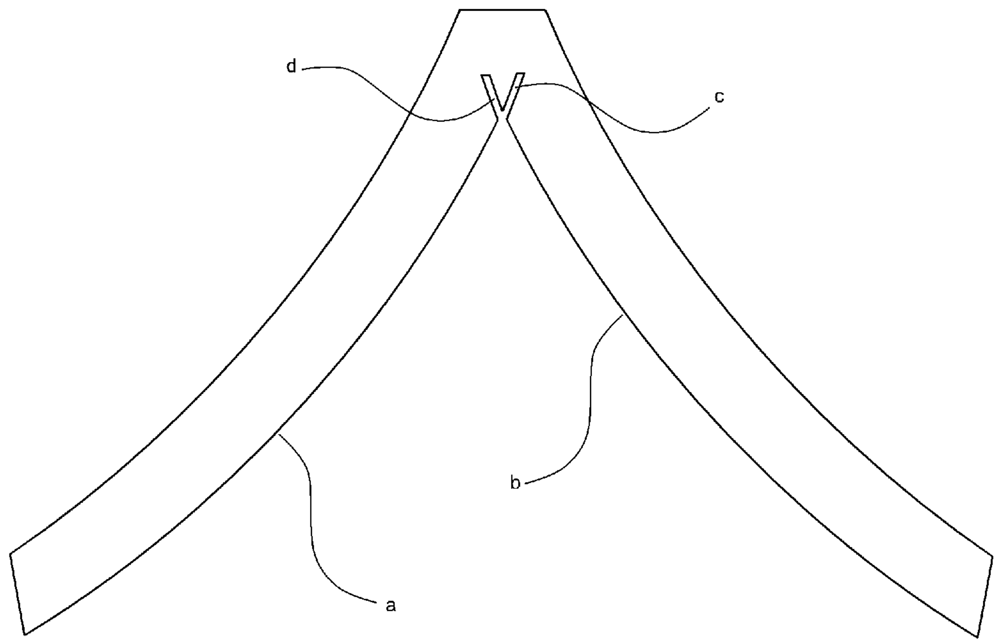
FIG. 5 presents a curved acute angle template in which the inner edges are convex. Two edges a and b are indicated. These edges intersect at an inside corner. Two channels c and d extend the edges a and b past the point of their intersection to allow guided cutting of the inside corner with a rotary cutter.

Templates may have more than one inside corner. For example, the interior portion of the five-pointed star template of FIG. 3A has five inside corners (and also five outside corners), and the interior portion of the hexagon template of FIG. 2 has six inside corners (and no outside corners). In general, a template may have as many inside corners and as many outside corners as are needed for a desired shape. For example, there may be 1, 2, 3, 4, 5, 6, 7, 8, 9, 10, or more inside corners and 0, 1, 2, 3, 4, 5, 6, 7, 8, 9, 10, or more outside corners.

Inside corners can be of any angle less than 180 degrees, for example 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, or 179 degrees, or fractions (halves, thirds, fourths, fifths, sixths, sevenths, eighths, ninths, tenths, etc.) thereof.

Figure 9:
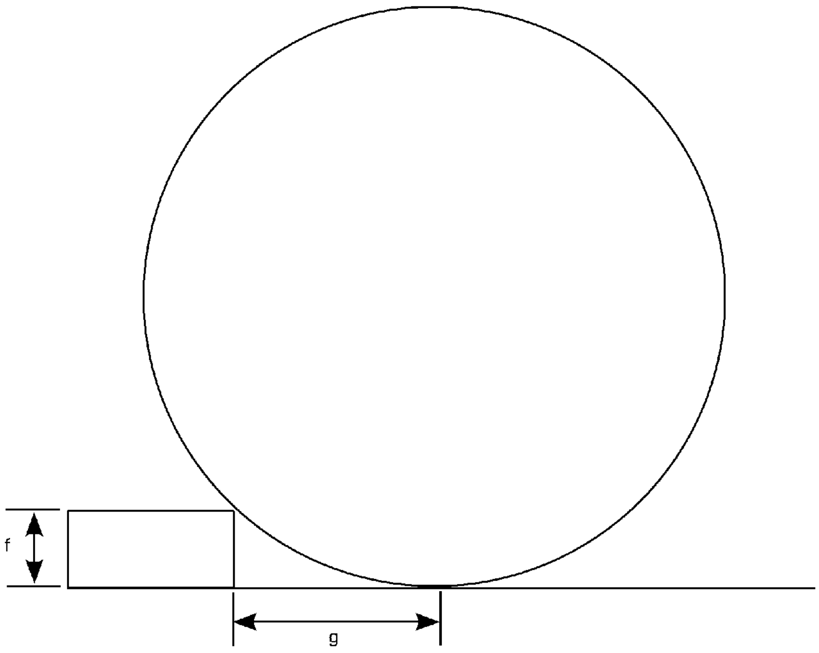
FIG. 9 shows the geometry of determining channel length when one wishes to stop cuts at a precise point. A circular rotary cutter blade is seen from the side and template material is shown as a rectangular block. If the rotary cutter encounters template material of thickness f, for example at the end of a channel, then cutting will cease approximately g units prior to the end of the channel, although the result will be somewhat affected by the depth to which the cutter blade sinks into the substrate (e.g., cutting mat) and/or into the template material as it comes to a stop. Channels comprising first a void and then a ramped or angled region of reduced template thickness will tend to resist wear from the cutting blade better than the rectangular step depicted in FIG. 9.
Figure 10A:
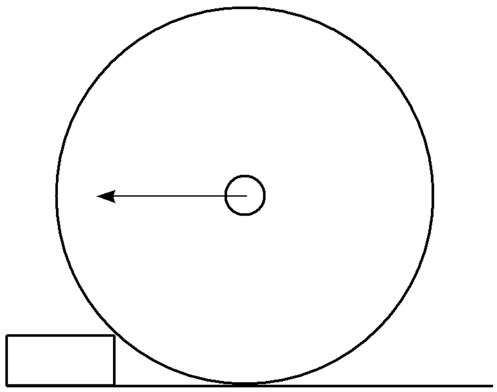
FIGS. 10A, 10B, and 10C illustrate different profiles for channel ends. In each figure, a circular rotary cutter is viewed from the side, with the arrow indicating the direction of travel of the rotary cutter as it approaches the end of the channel. The block of material at left in each figure represents the template material that terminates the channel, and the line under the circle represents cloth or other material that the template is resting upon.
Figure 10B:
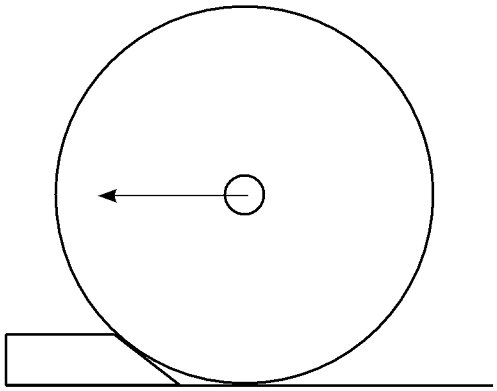
Figure 10C:
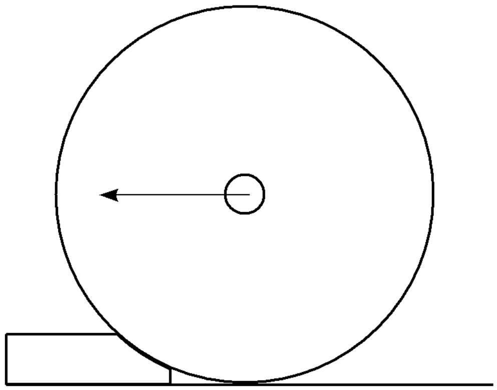

The channels used to allow cutting (or other operation) to proceed up to or past the point of intersection may be voids in which all template material has been removed. Channels may also be regions of the template in which the thickness of the template material is reduced, or may be a combination of void region(s) and region(s) of reduced thickness. Channels that are not composed entirely of voids in the template material can be useful, for example, in allowing a rotary cutter head to cut up to the intersection point but preventing unwanted cutting beyond the intersection point, although this may also be accomplished with a channel that is entirely a void channel as is illustrated in FIG. 9.

Figure 6A:
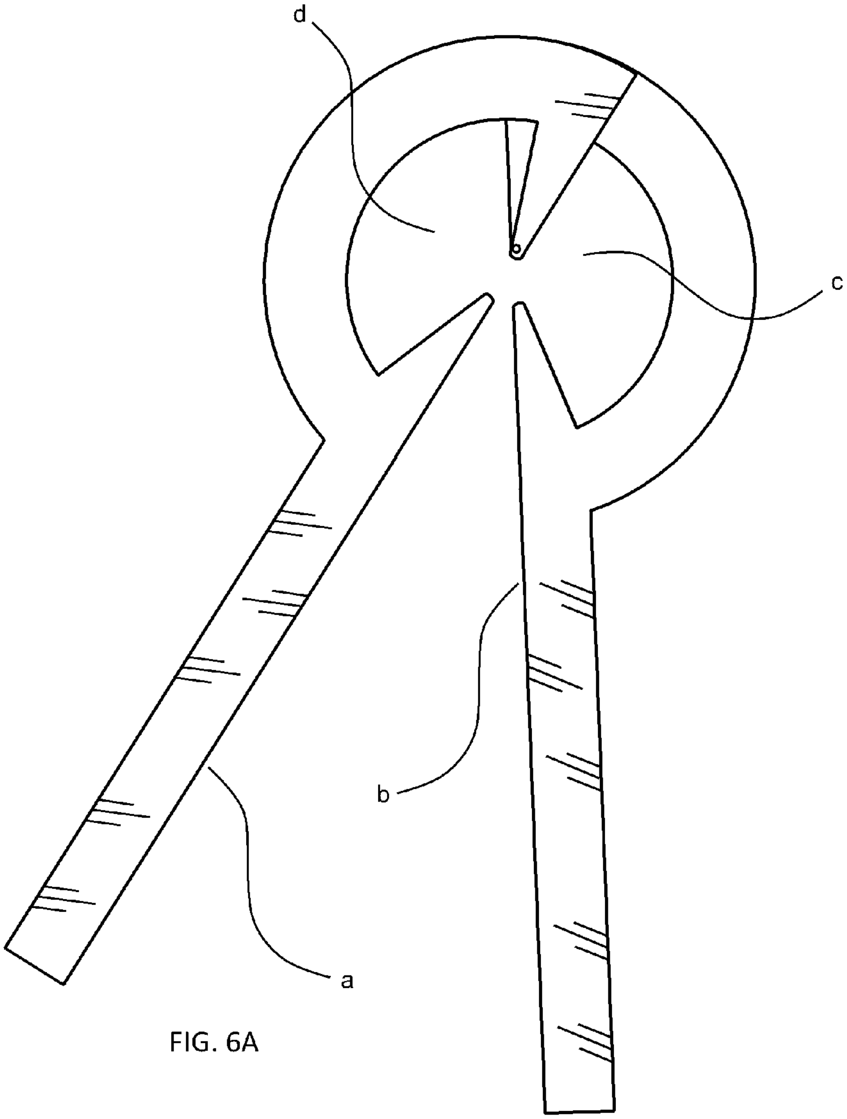
FIG. 6A shows an adjustable angle template in a relatively “closed” configuration for cutting an acute angle. Two edges a and b are indicated. These edges intersect at an inside corner. Two channels c and d extend the edges a and b past the point of their intersection to allow guided cutting of the inside corner with a rotary cutter.
Figure 6B:
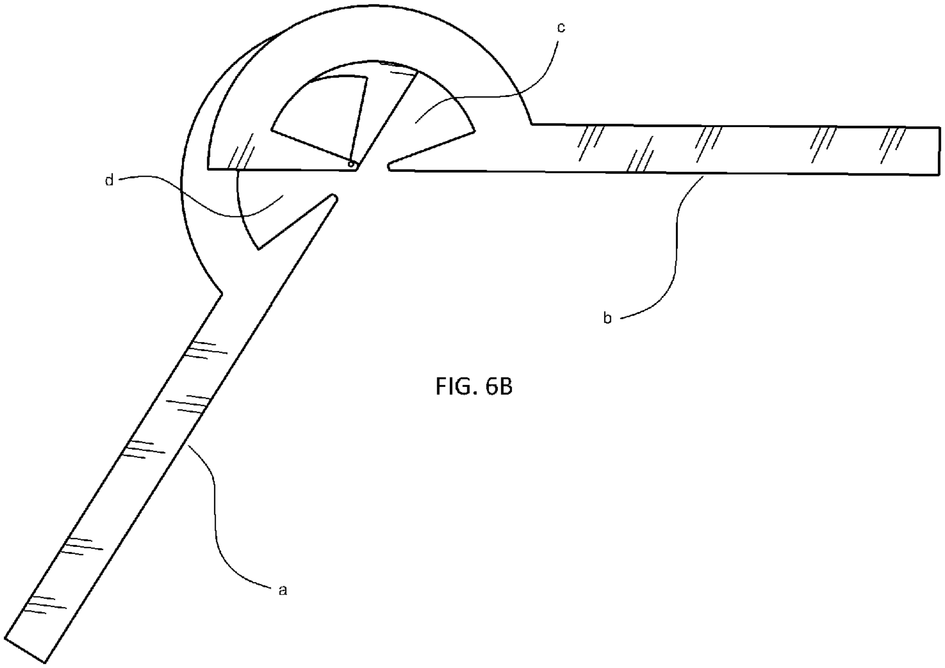
FIG. 6B illustrates an adjustable angle template in a relatively “open” configuration for cutting an obtuse angle. Two edges a and b are indicated. These edges intersect at an inside corner. Two channels c and d extend the edges a and b past the point of their intersection to allow guided cutting of the inside corner with a rotary cutter.

Channels may be straight slots or voids, or may be any other shape that allows a rotary cutter head or other tool to operate up to or beyond the point of intersection. For example, the design of the adjustable angle template of FIG. 6 results in channels that are broad and pie-shaped except when the template is opened nearly to its maximum angle. Preferably the channels have at least one straight edge to assist in guiding the rotary cutter or other tool, although this is not required. Suitable shapes for channels include straight, curved, tear-drop, circular, semicircular, sector (e.g., pie-shaped), rectangular, keyhole (i.e., a rectangular slot terminating in a circular region), or other regular or irregular shapes.

Channels may be of any width that allows entry of the desired rotary cutter or other tool. For example, channels may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more units wide, or fractions thereof, where the units are selected from tenths of millimeters, millimeters, centimeters, hundredths of inches, tenths of inches, or inches.

The distance that a channel extends beyond the point of intersection may be adapted to the diameter of the rotary cutter blade, or more generally to the shape of the guided tool, to allow the cutting or other operation to approach as close to the point of intersection as is desired. By varying the length of the channel, the cutting operation can be terminated short of the point of intersection, at the point of intersection, or past the point of intersection. Often it may be desirable to tune the length of a channel so that the intended cutting tool, for example a 45-mm diameter rotary cutter, will cut up to the point of intersection but no farther. This distance can easily be calculated geometrically from the diameter of the rotary cutter blade and from the thickness of the template material that the cutter will eventually come up against after it enters the channel, as is shown in FIG. 9.

Figure 7:
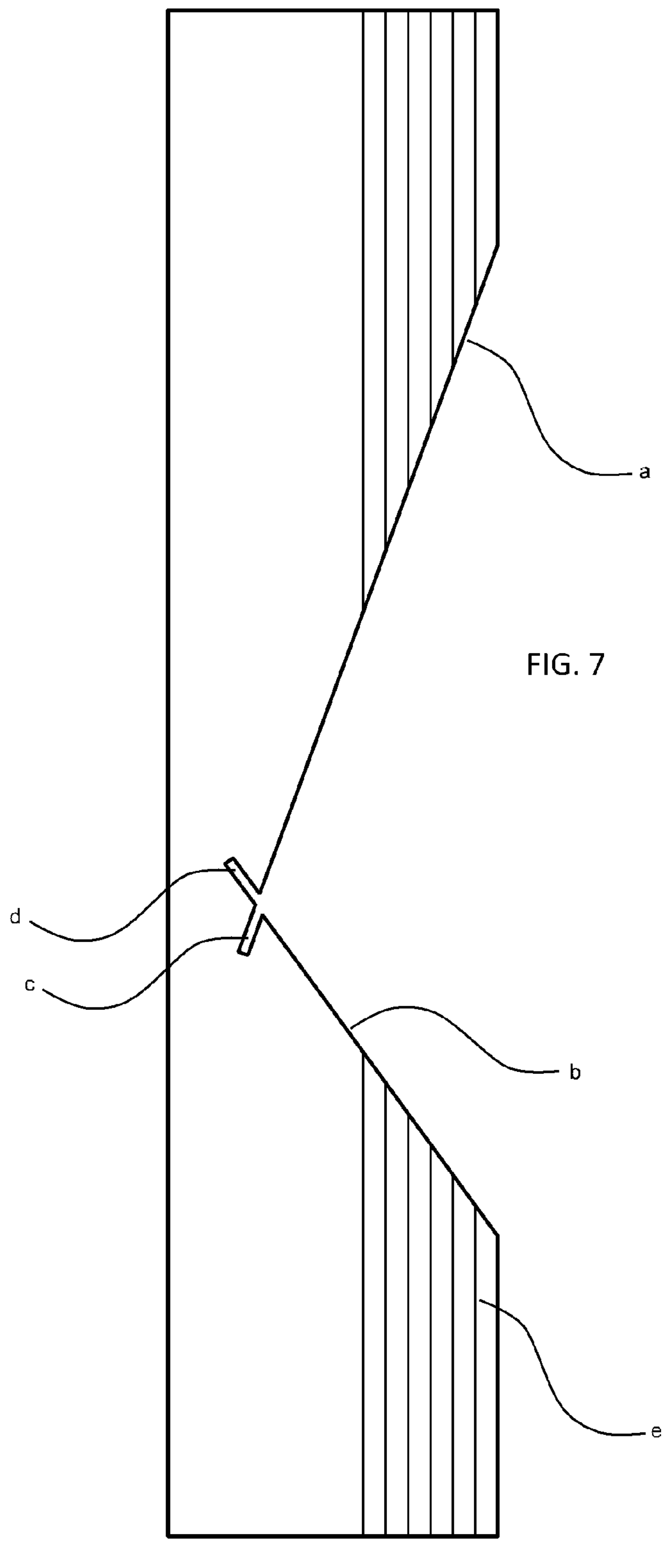
FIG. 7 presents a template for cutting a triangle of cloth. When the cut cloth piece is joined along its long edge with another piece that is its mirror image, the two pieces together form one section (out of five total) of a five-pointed star. Two edges a and b are indicated. These edges intersect at an inside corner. Two channels c and d extend the edges a and b past the point of their intersection to allow guided cutting of the inside corner with a rotary cutter. Also shown are a number of guide lines e that are etched vertically on the template. These guide lines facilitate positioning the template over a piece of cloth, for example with an already straight-cut edge of the cloth lined up under a guide line. By selecting different guide lines for positioning the template, the user can easily cut similar triangles of different sizes and hence can assemble five-pointed stars of different sizes.
Figure 8:
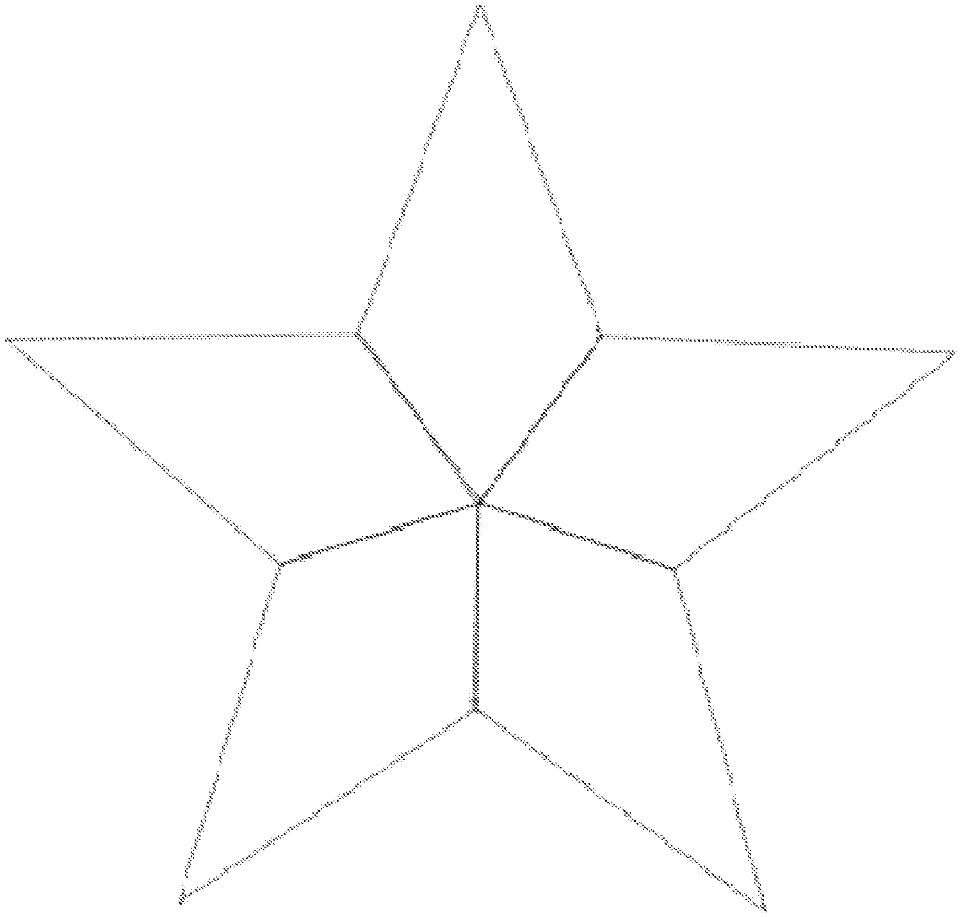
FIG. 8 shows a five pointed star that could be constructed using the template of FIG. 7. Each of the five subunits of the star is composed of two triangular pieces of cloth cut with the template and then joined together as previously described.

Templates may be constructed of virtually any material, such as metal; plastic; wood; reinforced composites, for example utilizing glass, carbon, natural, and/or polymer fibers in cured resin(s); or glass; or any combination of these. Transparent or translucent materials are not required but can be advantageous for positioning the template. For example, the template of FIG. 7 can be more easily positioned using the guide lines when the template is transparent. Transparent templates also allow easy visualization of patterns that may be present in the material to be cut, for example, quilting cloth.

Adjustable templates may be hinged; may rotate around a pin or other pivot point; may incorporate tracks for repositioning by sliding; may be detachable and reattachable in a variety of orientations using interlocking pins and holes in the manner of LEGO blocks; may be held in a particular orientation by clamp(s), screw(s), clip(s), or other fasteners; or use any other movable connection known in the art. Adjustable templates may include stops to facilitate adjustment to certain preferred angles such as multiples of 10, 15, or 30 degrees, or fractions (halves, thirds, fourths, fifths, sixths, sevenths, eighths, ninths, tenths, etc.) of 360 degrees or 180 degrees. Stops may include, for example, protrusion(s) under strain or compression along with indentation(s) that provide preferred resting spots for the protrusion(s).

A wide range of thicknesses are suitable for templates of the invention. For example, templates may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more units thick, or fractions thereof, where the units are selected from tenths of millimeters, millimeters, centimeters, hundredths of inches, tenths of inches, or inches.

Templates may incorporate 1, 2, 3, 4, 5, 6, 7, 8, 9, 10, or more guide lines, and these may be irregularly spaced or spaced at regular intervals. For example, guide lines may be spaced at intervals of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, or more units, or fractions (halves, thirds, fourths, fifths, sixths, sevenths, eighths, ninths, tenths, etc.) thereof, where the units are selected from tenths of millimeters, millimeters, centimeters, hundredths of inches, tenths of inches, or inches. Guide lines may be parallel to an edge or oriented at an angle to an edge, for example 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, or 179 degrees, or fractions (halves, thirds, fourths, fifths, sixths, sevenths, eighths, ninths, tenths, etc.) thereof.

I claim:

1. A template comprising
a first edge, and
a second edge;
wherein said first edge and said second edge are
fixedly connected such that said first edge and said second edge meet at an angle that is less than 180 degrees, or
movably connected such that said first edge and said second edge can be oriented to meet at an angle that is less than 180 degrees; and
wherein said first edge or said second edge or both are extended past the point of their intersection by a channel.

2. The template of claim 1, wherein the template comprises 2, 3, 4, 5, 6, 7, 8, 9, 10, 11, 12, 13, 14, 15, or more inside corners and each said inside corner has two channels.

3. The template of claim 1, wherein said channels are between 1 mm and 3 mm in width.

4. The template of claim 1, wherein said channels are between 2 mm and 10 mm in length.

5. The template of claim 1, wherein said edges are made of acrylic or other plastic.

6. The template of claim 1, wherein said template is marked with at least one guide line parallel to said first edge or said second edge.

7. The template of claim 6, wherein said template is marked with at least three guide lines parallel to said first edge or said second edge, and said guide lines are spaced at equal intervals from the edge.

8. The template of claim 1, wherein the template thickness is at least 1 mm but less than 5 mm.

9. The template of claim 1, wherein said first edge or said second edge is concave curved.

10. The template of claim 1, wherein said first edge or said second edge is convex curved.

11. The template of claim 1, wherein said first edge and said second edge are movably connected such that said first edge and said second edge can be oriented to meet at an angle that is less than 180 degrees, and wherein said template provides stop(s) to facilitate orientation of said first edge and said second edge to at least one preferred angle.

* * * * *